(12) United States Patent
Wade et al.

(10) Patent No.: US 11,498,498 B2
(45) Date of Patent: Nov. 15, 2022

(54) LOCK-PIN ASSEMBLY

(71) Applicant: AMERICAN FURUKAWA, INC., Plymouth, MI (US)

(72) Inventors: Jere Wade, Swartz Creek, MI (US); Alberto Castro Padilla, Baja California (MX)

(73) Assignee: AMERICAN FURUKAWA, INC., Plymouth, MI (US)

( * ) Notice: Subject to any disclaimer, the term of this patent is extended or adjusted under 35 U.S.C. 154(b) by 47 days.

(21) Appl. No.: 17/192,608

(22) Filed: Mar. 4, 2021

(65) Prior Publication Data

US 2022/0281395 A1 Sep. 8, 2022

(51) Int. Cl.
*B60R 16/027* (2006.01)
*H01R 35/02* (2006.01)

(52) U.S. Cl.
CPC ........... *B60R 16/027* (2013.01); *H01R 35/02* (2013.01); *H01R 2201/26* (2013.01)

(58) Field of Classification Search
CPC .... H01R 2201/26; H01R 35/02; H01R 35/04; B60R 16/027
USPC ....................................................... 439/164
See application file for complete search history.

(56) References Cited

U.S. PATENT DOCUMENTS

| | | |
|---|---|---|
| 5,248,260 A | 9/1993 | Ida |
| 5,741,145 A | 4/1998 | Kikkawa et al. |
| 5,752,843 A | 5/1998 | Kawamoto et al. |
| 6,059,590 A | 5/2000 | Bolen et al. |
| 7,452,224 B1 * | 11/2008 | McDonald ............ B60R 16/027 439/164 |
| 8,834,179 B2 * | 9/2014 | Park ..................... B60R 16/027 439/15 |
| 9,627,832 B2 * | 4/2017 | Wade .................... B60R 16/027 |
| 2016/0036184 A1 | 2/2016 | Wade |

FOREIGN PATENT DOCUMENTS

| | | |
|---|---|---|
| FR | 3009850 A1 | 2/2015 |
| JP | H0719989 U | 4/1995 |
| JP | H08213133 U | 8/1996 |
| JP | 2005327575 A | 11/2005 |

OTHER PUBLICATIONS

European Search Report regarding corresponding EP App. No. 22159735.4; dated Aug. 5, 2022.

* cited by examiner

*Primary Examiner* — Oscar C Jimenez
*Assistant Examiner* — Paul D Baillargeon
(74) *Attorney, Agent, or Firm* — Dickinson Wright PLLC

(57) ABSTRACT

A steering roll connector assembly includes a roll stator. The assembly also includes a roll rotor telescoped in and rotatably coupled to the roll stator to allow relative rotation between the roll rotor and roll stator. The assembly further includes a lock-pin operatively engaging the roll rotor, and the lock-pin is releasable from the operative engagement with the roll rotor. The assembly yet further includes an arm extending from the lock-pin and operatively engaging the roll stator when the lock-pin couples to the roll rotor to prevent relative rotation between the roll rotor and the roll stator.

15 Claims, 8 Drawing Sheets

LOCK-PIN ASSEMBLY

TECHNICAL FIELD

The present disclosure relates to a steering assembly and, more particularly, to a steering roll connector of the steering assembly.

BACKGROUND

Vehicles such as cars, trucks, sport utility vehicles, crossovers, mini-vans, or other suitable vehicles employ steering assemblies to facilitate steering of the vehicle. Steering assemblies typically include a steering column coupling between a hand wheel and wheels of the vehicle. When the hand wheel rotates, relative rotation of the hand wheel transfers through the steering column to turn the wheels and steer the vehicle. Accordingly, a driver engaging, and rotating, the hand wheel may steer the vehicle.

Hand wheels typically include electronic components in communication with an electrical system of the vehicle. More specifically, wires connect between the electrical components of the hand wheel and the electrical system of the vehicle. These wires, however, can become tangled and break due to over rotation of the hand wheel. Accordingly, the steering column typically employs a steering roll connector configured to connect between wires of the electronic components and the electrical system to prevent the wires from becoming tangled and breaking.

The steering roll connector typically includes a roll stator and a roll rotor rotatably coupled to the roll stator. The roll rotor may also include an electrical connector that electrically connects between the wires of the electronic components and the electrical system. The relative rotation between the roll stator and the roll rotor prevents the wires from becoming tangled and breaking. However, the relative rotation may cause a misalignment between the hand wheel and the steering column during assembly of the steering system.

SUMMARY

According to one aspect of the disclosure, a steering roll connector assembly includes a roll stator. The assembly also includes a roll rotor telescoped in and rotatably coupled to the roll stator to allow relative rotation between the roll rotor and roll stator. The assembly further includes a lock-pin operatively engaging the roll rotor, and the lock-pin is releasable from the operative engagement with the roll rotor. The assembly yet further includes an arm extending from the lock-pin and operatively engaging the roll stator when the lock-pin couples to the roll rotor to prevent relative rotation between the roll rotor and the roll stator.

According to another aspect of the disclosure, a method of assembling a steering roll assembly is provided. The method includes providing a roll stator defining a stator recess. The method also includes providing a roll rotor having an outer wall, and the outer wall defines a rotor recess. The method further includes providing a lock-pin having an arm, and the lock-pin defining a male portion of a snap-fitting. The method yet further includes providing a lock-pin support defining a female portion of the snap-fitting, and the lock-pin assembly having a protrusion. The method also includes coupling the lock-pin to the lock-pin support by snap-fitting the male portion to the female portion. The method further includes disposing the arm of the lock-pin in the stator recess. The method yet further includes coupling the lock-pin support to the roll rotor by snap-locking the protrusion in the rotor recess.

According to yet another aspect of the disclosure, a method of assembling a steering roll assembly is provided. The method includes providing a roll stator. The method also includes providing a roll rotor defining a lock-pin support where the lock-pin support has a ledge and a bottom spaced from the ledge. The method further includes providing a lock-pin opening having a width. The method yet further includes providing a lock-pin recess defined between the ledge and the bottom. The method also includes a lock-pin having a pair of snap legs extending outwardly from the lock-pin to a snap-leg width greater than the width. The method further includes providing a tool having a slot with the width. The method yet further includes disposing the lock-pin in the slot of the tool, wherein the snap-leg width is compressed to the width. The method also includes positioning the tool to align the slot with the lock-pin opening. The method further includes sliding the lock-pin, in the slot, towards the lock-pin opening to dispose the pair of snap leg into the lock-pin recess, whereby the pair of snap legs expend to the snap-leg width to retain the lock-pin the recess.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

It is to be appreciated that the Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

DETAILED DESCRIPTION

The following disclosure is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Generally, vehicles employ steering assemblies to facilitate steering of a vehicle by a driver. Steering assemblies typically include a steering column, which may include a steering shaft, coupling between a hand wheel and wheels of the vehicle. When the hand wheel rotates, relative rotation of the hand wheel transfers through the steering column to the wheels of the vehicle. Accordingly, a driver engaging, and turning, the hand wheel may steer the vehicle.

Hand wheels typically include electronic components in communication with an electrical system of the vehicle. More specifically, wires connect between the electrical components of the hand wheel and the electrical system of the vehicle. To prevent tangling and breakage of the wires due to over rotation of the hand wheel, a steering roll connector may be used to connect between the electrical components of the hand wheel and the electrical system of the vehicle.

Figure 2:
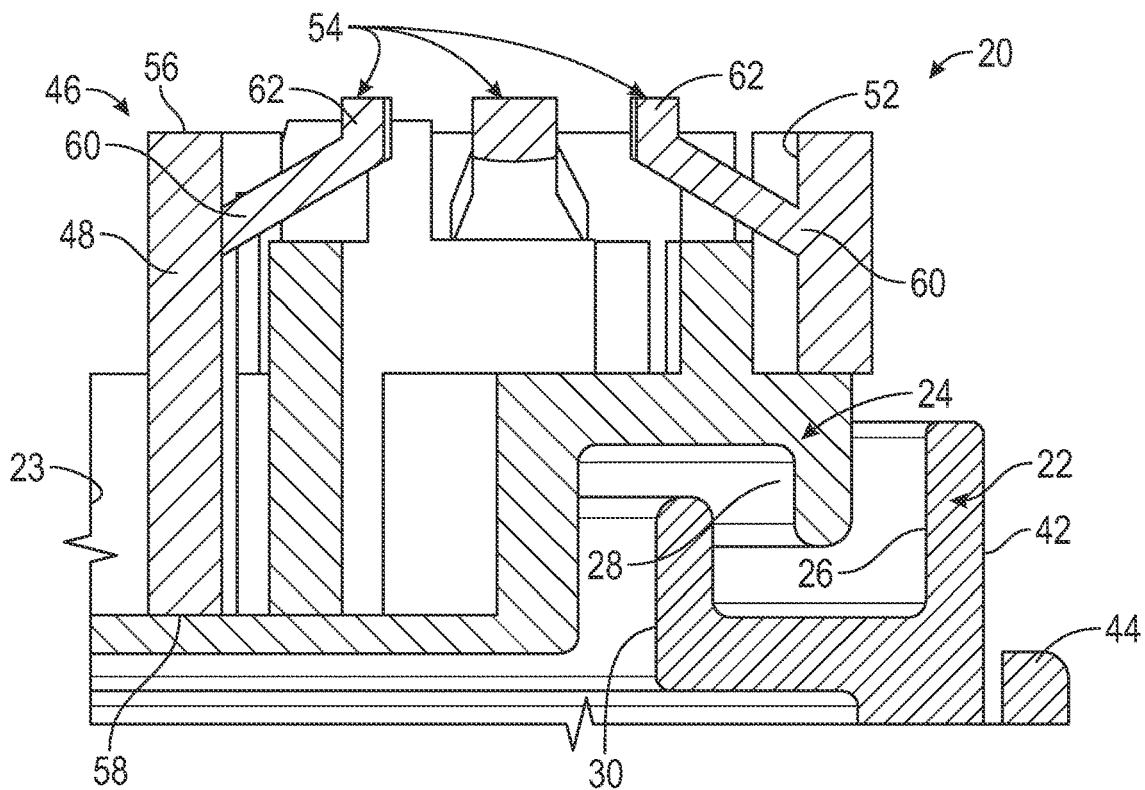
FIG. 2 is a sectional view of the steering roll connector, taken along line A of FIG. 4.

With reference to the FIGS., a steering roll connector 20 of the present disclosure is illustrated. The steering roll connector 20 may include a roll stator 22 and a roll rotor 24, 124 telescoped in and rotatably coupled to the roll stator 22. The telescoped relationship between the roll stator 22 and the roll rotor 24, 124 facilitates relative rotation between the roll rotor 24, 124 and the roll stator 22. In some embodiments, the roll stator 22 may define a female seat 26 (FIG. 2) and the roll rotor 24, 124 may define a male seat 28 (FIG. 2). The female and male seats 26, 28 may engage one another and be configured to facilitate the relative rotation between the roll stator 22 and the roll rotor 24, 124.

The roll stator 22 may define a first central opening 30 (FIG. 2), and the roll rotor 24, 124 may define a second central opening 32, 132 coaxially aligned with, and telescoped in, the first central opening 30. The second central opening 32, 132 of the roll rotor 24, 124 is configured to receive a steering column, or shaft (not illustrated), and the roll rotor 24, 124 is configured to couple the steering roll connector 20 to the steering column. It is to be appreciated the roll rotor 24, 124 may be configured in many different ways to receive and couple with the steering column and be within the scope of the present invention. In some embodiments, the roll rotor 24, 124 may have an upper surface, or outer wall, 34, 134 and an electrical connector housing 36, 136 may be integrally formed with, or coupled to, the upper surface 34, 134. The electrical connector housing 36, 136 may be configured to facilitate the connection between the electrical components of the hand wheel and the electrical system of the vehicle.

The steering roll connector 20 may also include a lock-pin 38, 138 (FIGS. 3 and 6) operatively engaged with the roll rotor 24, 124. The operative engagement of the lock-pin 38, 138 with the roll rotor 24, 124 provides for the lock-pin 38, 138 to engage, and to be releasable from its engagement with, the roll rotor 24, 124. More specifically, the lock-pin 38, 138 may engage and disengage from the roll rotor 24 without breaking. In some embodiments, the lock-pin 38, 138 may include an arm 40, 140 extending from the lock-pin 38, 138. When the lock-pin 38, 138 couples to the roll rotor 24, 124, the arm 40, 140 may operatively engage (i.e., may directly or indirectly couple to) the roll stator 22 to prevent the relative rotation between the roll rotor 24, 124 and the roll stator 22. In some embodiments, the roll stator 22 may have an exterior wall 42 that defines one or more slots, or stator recesses, 44 for receiving the arm 40, 140 of the lock-pin 38, 138.

Figure 7:
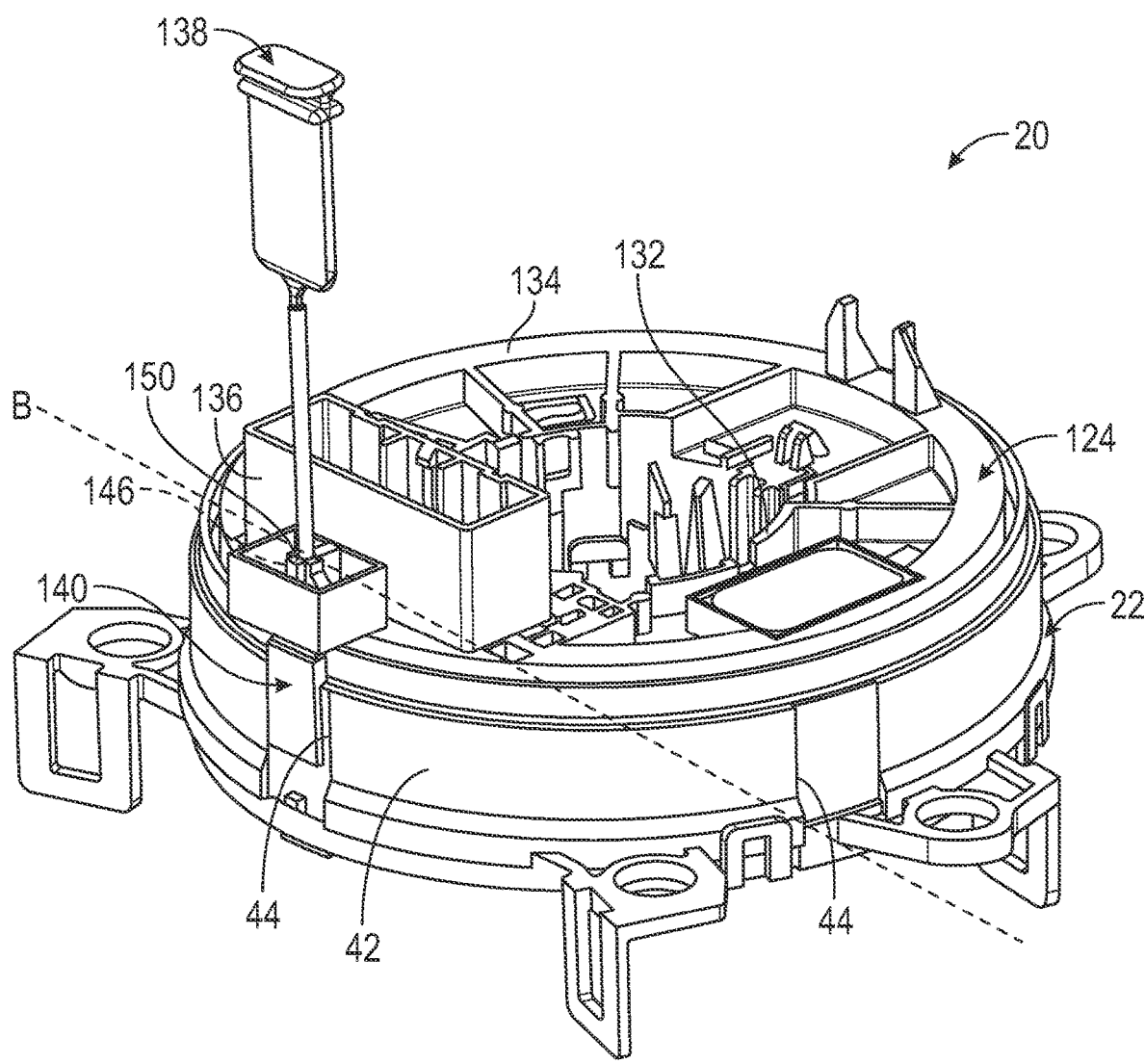
FIG. 7 is a perspective view illustrating an embodiment of the steering roll connector including the lock-pin of FIG. 6.
Figure 8:
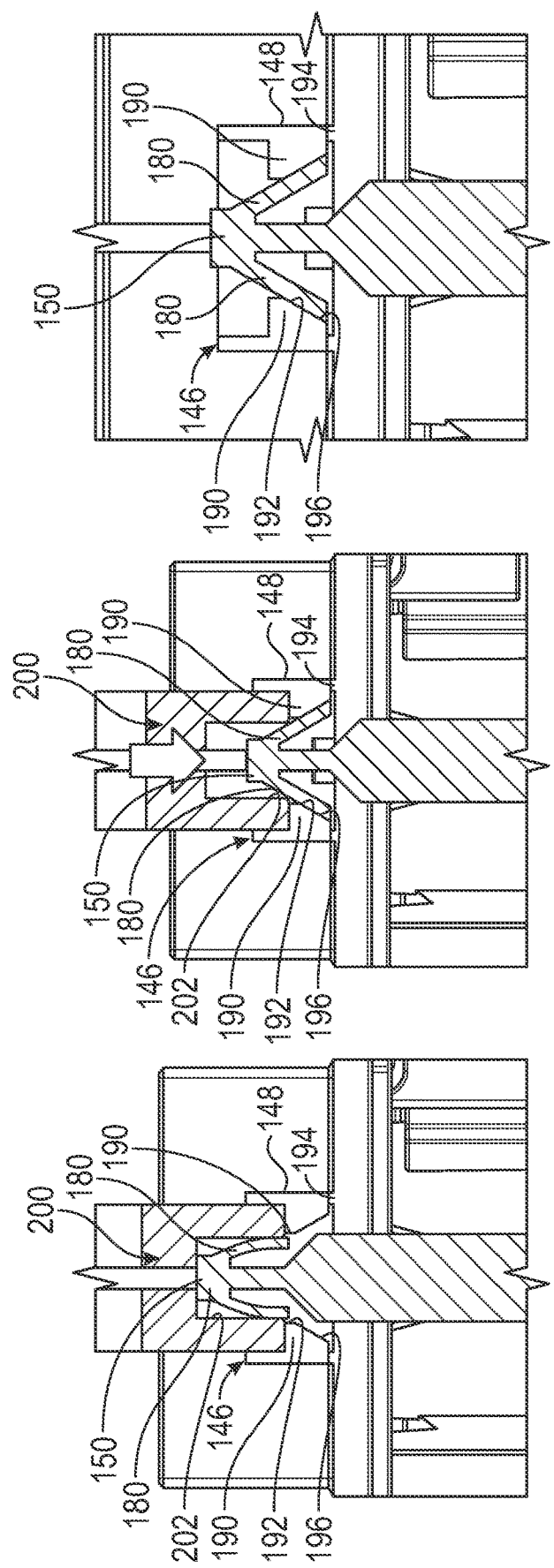
FIG. 8 is a sectional view, taken along line B of FIG. 7, illustrating the steering roll connector with, taken along line B of FIG. 7, and illustrating the lock-pin of FIG. 6 being installed with a tool.

In some embodiments, a lock-pin support 46, 146 may couple, directly or indirectly, to the roll rotor 24, 124. In some embodiments, the lock-pin support 46, 146 is coupled to the roll rotor 24 by being integrally formed with the roll rotor 24, 124. With reference to FIGS. 7 and 8, the lock-pin support 146 is coupled to the roll rotor 124 by being integrally formed with the roll rotor 124.

Figure 1:
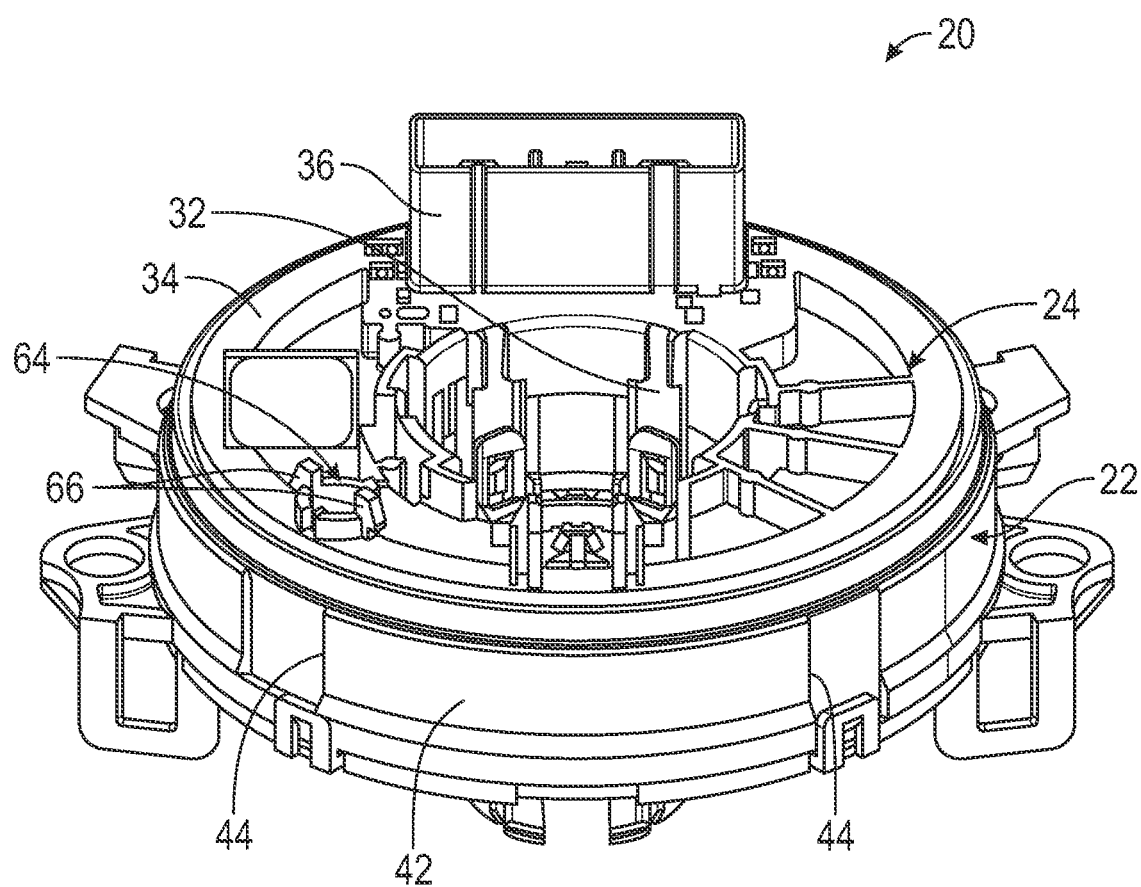
FIG. 1 is a perspective view illustrating an embodiment of a steering roll connector without a lock-pin or lock-pin support.
Figure 3:
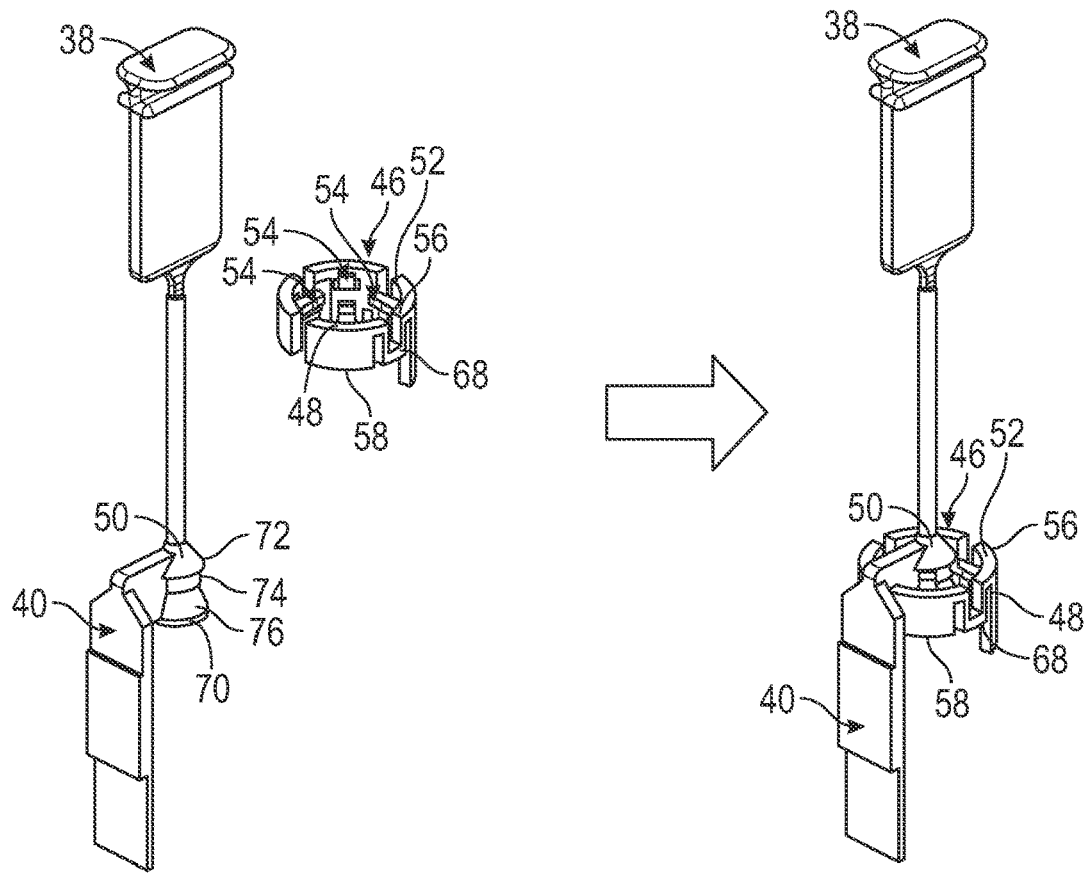
FIG. 3 is a perspective view illustrating an embodiment of a lock-pin and a lock-pin support.
Figure 4:
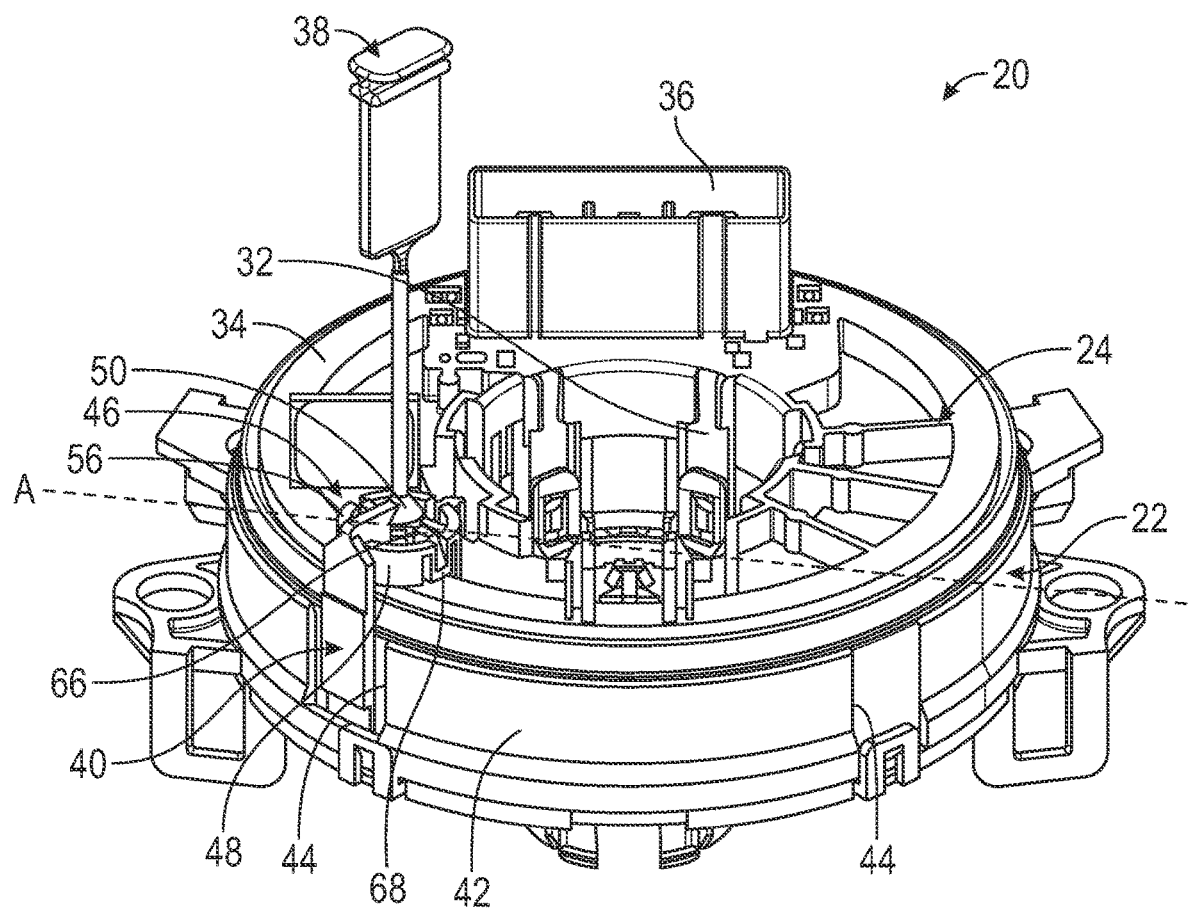
FIG. 4 is a perspective view illustrating the steering roll connector including the lock-pin and lock-pin support of FIG. 3.
Figure 5:
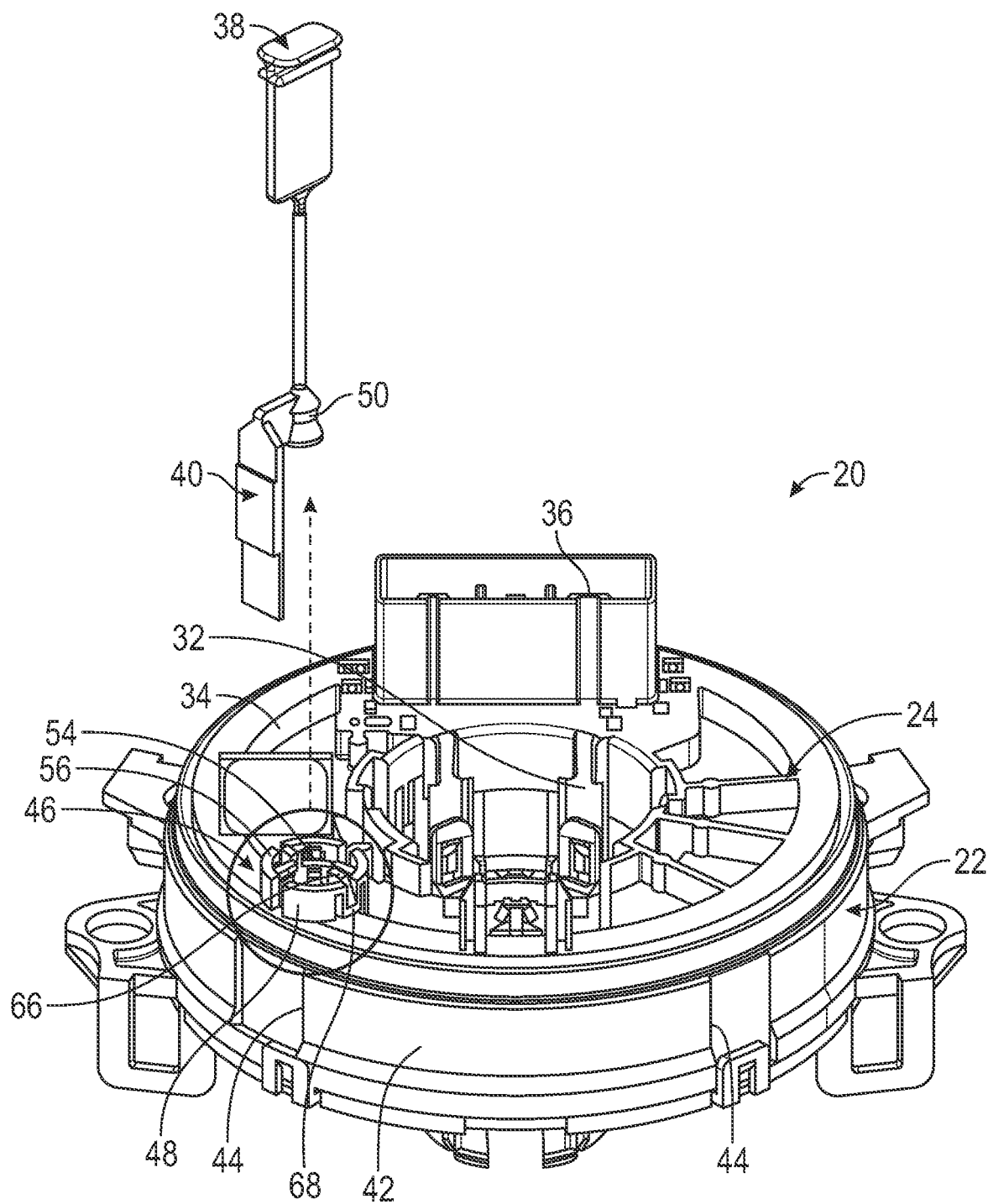
FIG. 5 is a perspective view illustrating the steering roll connector and illustrating the lock-pin and lock-pin support of FIG. 3 being removed from the steering roll connector.

In some embodiments, the lock-pin support 46 may couple to the roll rotor 24 by a snap-fitting or snap-locking arrangement. More specifically, and as best illustrated in FIG. 1, the roll rotor 24 may have a male protrusion 64 that may be integrally formed with, or coupled to, the upper surface 34, 134. The male protrusion 64 may have one or more clips 66 configured to engage the lock-pin support 46 to facilitate the snap-fitting or snap-locking arrangement. As best illustrated in FIG. 3-5, the lock-pin support 46 may define one or more female, or clip, recesses 68 configure to receive the clips 66 of the male protrusion 64 to facilitate the snap-fitting or snap-locking arrangement. It is to be appreciated that the snap-fitting or snap-locking arrangement may be permanent (e.g., the lock-pin support 46 and the male protrusion 64, once coupled, cannot be uncoupled) or releasable (e.g., the lock-pin support 46 and the male protrusion 64 may be coupled and uncoupled).

In some embodiments, the lock-pin 38, 138 may releasably engage and couple to the lock-pin support 46, 146. In some embodiments, the lock-pin 38, 138 is released from its releasable engagement and coupling to the lock-pin support 46, 146 when a force is applied (e.g., when the lock-pin is manually pulled) to the lock-pin 38, 138 in a direction away from the top end of the lock-pin support 46, 146. The lock-pin 38, 138 may releasably engage and couple to the lock-pin support 46, 146 by a snap-fitting arrangement. More specifically, the lock-pin support 46, 146 may define a female portion of the snap-fitting arrangement and the lock-pin may have an end configured as a male portion 50, 150 of the snap-fitting arrangement.

With reference to FIGS. 2-6, the lock-pin support 46 may have a base 48 that defines a lock-pin opening 52. The lock-pin opening 52 may be configured to receive the male portion of the lock-pin 38. The lock-pin support 46 may also include a plurality of teeth 54. The teeth 54 may extend from the base 48 and radially inward into the lock-pin opening 48, and the teeth 54 may be configured to releasably engage and couple to the male portion of the lock-pin 38.

In some embodiments, the base 48 has a top end 56 and a bottom end 58 spaced from the top end 58. The base 42 may also have an interior surface (shown in the FIGS., but not numbered) that at least partially defines the lock-pin opening 52 and is disposed between the top and bottom ends 56, 58. Each of the teeth 54 may have a base interface end 60 (FIG. 2) that is in contact with the interior surface. The base interface end 60 may directly or indirectly couple to the interior surface. Each of the teeth 54 may extend from the base interface end 60 upwardly, in a direction towards the top of the base 48, to a tab end 62 (FIG. 2). As best illustrated in FIG. 3, the tab end 62 may releasably engage and couple to the male portion of the lock-pin 38.

In some embodiments, and as best illustrated in FIG. 3, the male portion 50 of the lock-pin 38 may have a male end 70 and a flared edge 72 spaced from the male end 70. The flared edge 72 may be configured to engage and reset on the tab ends 62 of the teeth 54 when the lock-pin 38 engages and couples to the lock-pin support 48. The male portion 50 may also have an engagement section 74 positioned adjacent the flared edge 72 and between the flared edge 72 and the male end 70. The lock-pin 38 may also have a flared section 76 that defines a taper from the engagement section 74 to the male end 70. When the lock-pin 38 releasably engages and couples to the lock-pin support 48 the teeth 54 releasably engage and couple to the engagement section 74 (e.g., the teeth 54 compress against the engagement section 74 to releasably engage and couple to the engagement section 74). In some embodiments, the tab ends 62 of the teeth 54 may define a tooth opening (not numbered), where the tooth opening is smaller in size than the lock-pin opening 52. In some embodiments, the male end 70 is larger in size than the tooth opening to prevent re-engagement and re-coupling between the lock-pin 38 and the lock-pin support 48 when the lock-pin 38 is pulled from the lock-pin support 48.

In some embodiments, the upper surface 34, 124 of the roll rotor 24, 124 may define a female, or rotor, recess (not illustrated). In such embodiments, the lock-pin support 46 may include one or more locking protrusions (not illustrated). The locking protrusions, when disposed in the rotor recess, may engage and couple to the roll rotor 24, 124 to define the snap-locking arrangement between the lock-pin support 46 and the roll rotor 24, 124.

Figure 6:
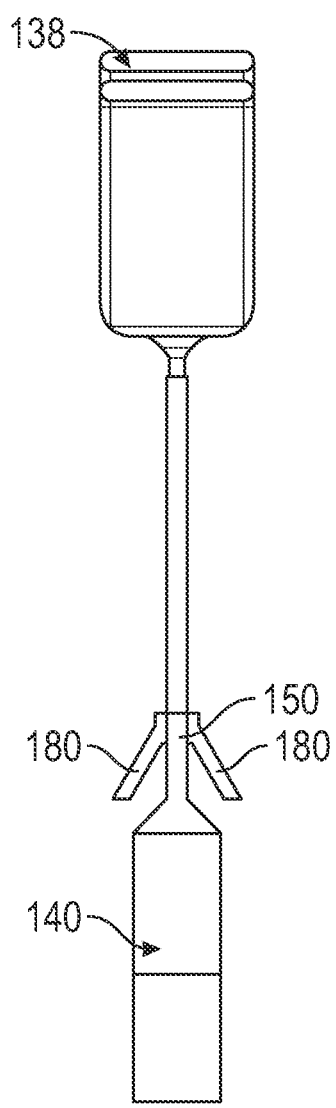
FIG. 6 is a perspective view illustrating an embodiment of a lock-pin.

In some embodiments, and as best illustrated in FIG. 6, the lock-pin 38 may define a pair of snap legs 180. The snap legs 180 may releasably engage and couple to the lock-pin support 146. In some embodiments, the lock-pin support 146 may include a ledge 190 that defines a lock-pin opening 192 having a width and/or diameter. The lock-pin support 146 may also include a bottom 194, and a lock-pin recess 196 defined between the ledge 192 and the bottom 194. The lock-pin recess 196 may be configured to receive the pair of snap legs 180, and the ledge 190 and the bottom 194 are configured to retain the pair of snap legs 180 in the recess 196. In some embodiments, the snap legs 180 extend outwardly from the lock-pin 138 to a snap leg width, and the snap legs 180 are configured to releasably engage and couple to the lock-pin support 146 when disposed in the recess 196. Moreover, to prevent engagement and coupling between the lock-pin 138 and the lock-pin support 146 when the lock-pin 138 is pulled from the lock-pin support 48.

The present disclosure also includes a method of assembling the steering roll assembly 20. In some embodiments, the method may include coupling the lock-pin 38 to the lock-pin support 46, 146 by snap-fitting the male portion 50, 150 to the female portion of the lock-pin support 46, 146. With reference to FIG. 3, the lock-pin 38 is illustrated in uncoupled with the lock-pin support 46 and illustrated coupled to the lock-pin support 46 by snap-fitting the male portion 50 to the female portion of the lock-pin support 46, 146.

The method may also include disposing the arm 40, 140 of the lock-pin 38, 138 in the stator recess 44, 144. With reference to FIGS. 4 and 7, the arm 40, 140 of the lock-pin 38, 138 in the stator recess 44, 144. The method may also include coupling the lock-pin support 48, 148 to the roll rotor 24, 124 by snap-locking the protrusion in the rotor recess.

Figure 10:
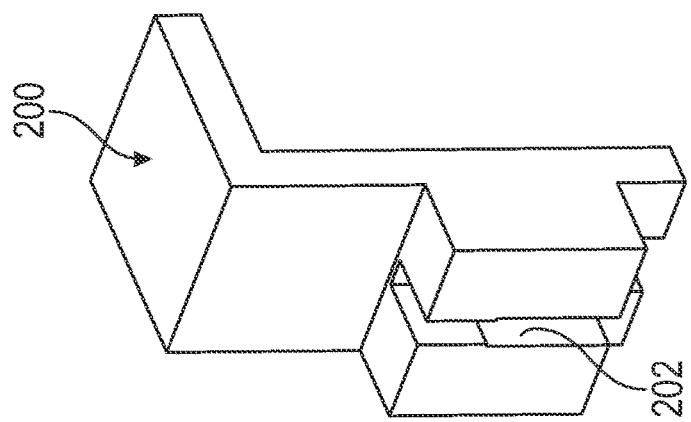
FIGS. 9 and 10 are perspective views illustrating the lock-pin of FIG. 6 and the toll of FIG. 8.
Figure 9:
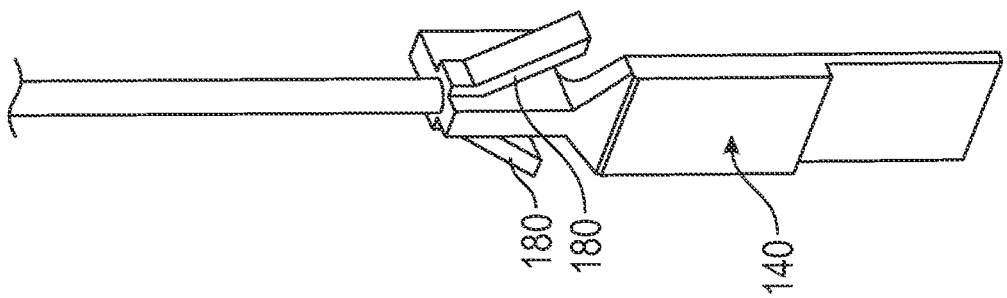
Figure 9:
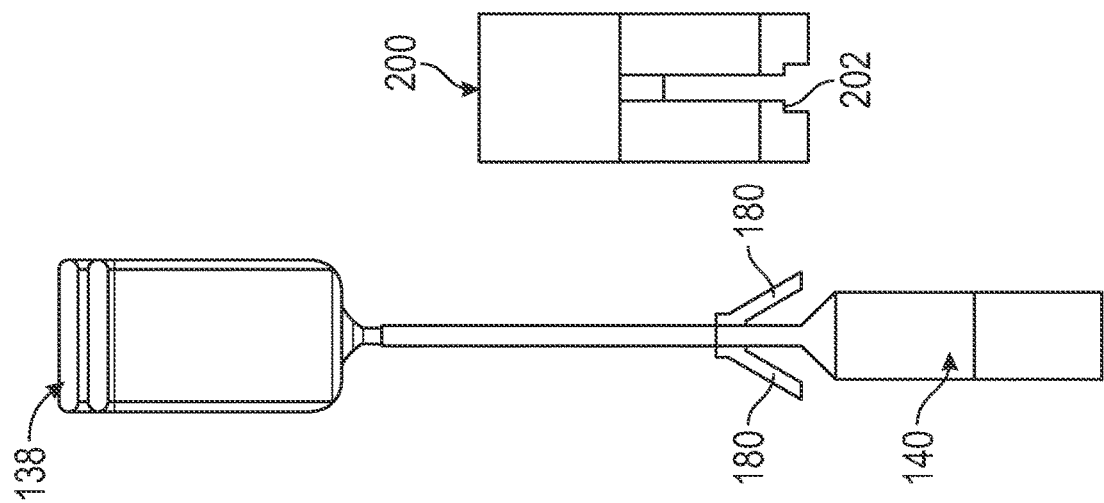

In some embodiments, and as best illustrated in FIGS. 8-10, the method may provide a tool 200 having a slot 202 with a slot width. As best illustrated in FIG. 8, the method may include disposing the lock-pin 138 in the slot of the tool 200, wherein the snap-leg width is compressed to the slot width. The method may also include positioning the tool 200 to align the slot 202 with the lock-pin opening 192. The method may also include sliding the lock-pin 138, in the slot 202, towards the lock-pin opening 192 to dispose the pair of snap legs 180 into the lock-pin recess 196, whereby the pair of snap legs 180 expend to the snap-leg width to retain the lock-p 138 in the recess.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering roll connector assembly, comprising:
    a roll stator;
    a roll rotor telescoped in and rotatably coupled to the roll stator to allow relative rotation between the roll rotor and roll stator;
    a lock-pin operatively engaging the roll rotor, and the lock-pin is releasable from the operative engagement with the roll rotor; and
    an arm extending from the lock-pin and operatively engaging the roll stator when the lock-pin couples to the roll rotor to prevent relative rotation between the roll rotor and the roll stator, wherein a lock-pin support couples to the roll rotor and the lock-pin releasably engages and releasably couples to the lock-pin support, wherein the lock-pin releasably engages and releasably couples to the lock-pin support by a snap-fitting arrangement, wherein the lock-pin support defines a female portion of the snap-fitting arrangement, and the lock-pin has an end configured as a male portion of the snap-fitting arrangement, wherein the lock-pin support comprises:
        a base defining a lock-pin opening configured to receive the male portion of the lock-pin; and
        a plurality of teeth extending from the base and radially inwardly into the lock-pin opening, where the teeth are configured to releasably engage and releasably couple to the male portion of lock-pin.

2. The steering roll assembly of claim 1, wherein the base comprises:
    a top end;
    a bottom end spaced from the top end;
    an interior surface at least partially defining the lock-pin opening and disposed between the top and bottom ends;
    each of the plurality of teeth having a base interface end in contact with the interior surface;
    each of the plurality of teeth extend from the base interface end upwardly, in a direction towards the top end, to a tab end, and the tab end is releasably engageable and releasably coupleable to the male portion of the lock-pin.

3. The steering roll assembly of claim 2, wherein the male portion of the lock-pin comprises:
    a male end;

a flared edge spaced from the male end, and the flared edge configured to engage and reset on the tab ends of the plurality of teeth when the lock-pin engages and couples to the lock-pin support; and an engagement section positioned adjacent the flared edge, and between the flared edge and the male end, and the plurality of teeth releasably engaging and releasably coupling to the engagement section when the lock-pin releasably engages and releasably couples to the lock-pin support.

4. The steering roll assembly of claim 3, wherein the tab ends of the plurality of teeth define a tooth opening, where the tooth opening is smaller in size than the lock-pin opening.

5. The steering roll assembly of claim 4, wherein the male portion of the lock-pin has a flared section defining a taper from the engagement section to the male end.

6. The steering roll assembly of claim 5, wherein the male end is larger in size than the tooth opening to prevent engagement and coupling between the lock-pin and the lock-pin support when the lock-pin is released from its releasable engagement and releasable coupling to the lock-pin support.

7. The steering roll assembly of claim 6, wherein the lock-pin is released from its releasable engagement and releasable coupling to the lock-pin support when a force is applied to the lock-pin in a direction away from the top end of the lock-pin support.

8. The steering roll assembly of claim 1, wherein the lock-pin releasably engages and releasably couples to the roll rotor by a snap-fitting arrangement.

9. The steering roll assembly of claim 8, wherein the roll rotor includes an upper surface, and the upper surface defines a rotor recess.

10. The steering roll assembly of claim 9, wherein the lock-pin support includes a protrusion, and the protrusion, when disposed in the rotor recess, engages and couples to the roll rotor to define the snap-fitting arrangement between the lock-pin support and the roll rotor.

11. The steering roll assembly of claim 1, wherein the roll stator defines a slot for receiving and engaging the arm of the lock-pin to prevent relative rotation between the roll rotor and the roll stator.

12. The steering roll assembly of claim 1, wherein the roll rotor defines the lock-pin support, and the lock-pin releasably engages and releasably couples to the lock-pin support.

13. The steering roll assembly of claim 12, wherein the lock-pin defines a pair of snap legs releasably engaging and releasably coupling to the lock-pin support.

14. The steering roll assembly of claim 13, wherein the lock-pin support comprises:
    a ledge defining a lock-pin opening;
    a bottom;
    a lock-pin recess defined between the ledge and the bottom, and the lock-pin recess is configured to receive the pair of snap legs, and the ledge and the bottom are configured to retain the pair of snap legs in the recess;
    the pair of snap legs extending outwardly from the lock-pin, and the pair of snap legs are configured to releasably engage and releasably couple to the lock-pin support when disposed in the recess, and to prevent engagement and coupling between the lock-pin and the lock-pin support when the lock-pin is released from its releasable engagement and releasable coupling to the lock-pin support.

15. A method of assembling a steering roll assembly, the method comprising:
    providing a roll stator defining a stator recess;
    providing a roll rotor having an outer wall, and the outer wall defines a rotor recess;
    providing a lock-pin having an arm, and the lock-pin defining a male portion of a snap-fitting;
    providing a lock-pin support defining a female portion of the snap-fitting, and the lock-pin support having a protrusion,
    coupling the lock-pin to the lock-pin support by snap-fitting the male portion to the female portion;
    disposing the arm of the lock-pin in the stator recess;
    coupling the lock-pin support to the roll rotor by snap-locking the protrusion in the rotor recess.

* * * * *